United States Patent [19]

Hughes

[11] 4,403,080

[45] Sep. 6, 1983

[54] ISOMERIZATION AND POLYMERIZATION OF HYDROCARBON RESINS

[75] Inventor: Vincent L. Hughes, Baton Rouge, La.

[73] Assignee: Exxon Research & Engineering Co., Florham Park, N.J.

[21] Appl. No.: 409,664

[22] Filed: Aug. 19, 1982

Related U.S. Application Data

[62] Division of Ser. No. 226,039, Jan. 19, 1981, Pat. No. 4,358,574.

[51] Int. Cl.$^3$ ................................................ C08F 4/14
[52] U.S. Cl. ...................................... 526/76; 526/290; 526/339
[58] Field of Search ........................................ 526/76

[56] References Cited

U.S. PATENT DOCUMENTS

| | | | |
|---|---|---|---|
| 2,753,325 | 7/1956 | Banes et al. ........................... | 260/82 |
| 2,753,382 | 7/1956 | Hamner ........................... | 260/23.7 C |
| 3,104,269 | 9/1963 | Schaffel et al. ..................... | 260/680 |
| 3,151,179 | 9/1964 | Kennedy et al. ................. | 260/683.2 |
| 3,268,617 | 8/1966 | Menapace et al. ............... | 260/683.2 |
| 3,290,404 | 12/1966 | Howmann et al. .............. | 260/683.2 |
| 3,577,398 | 5/1971 | Pace et al. .......................... | 260/85.3 |
| 3,920,765 | 11/1975 | Frech et al. ....................... | 260/683.2 |

*Primary Examiner*—Stanford M. Levin
*Attorney, Agent, or Firm*—Roland A. Dexter

[57] ABSTRACT

Hydrocarbon resins having an increased softening point are obtained by a process featuring the sequential steps of: isomerizing the 2-methylbutene-1 component of a branched olefin modifier stream whereby its 2-methylbutene-2 content is enriched; polymerizing a feedstock consisting of the mixture of said enriched modifier stream and a piperylene rich feed stream; and, recovering said hydrocarbon resin with properties enhancing its utility for adhesive applications.

4 Claims, No Drawings

ISOMERIZATION AND POLYMERIZATION OF HYDROCARBON RESINS

This is a division of application Ser. No. 226,039, filed 1/19/81, U.S. Pat. No. 4,358,574.

The invention relates to an improved process for the production of hydrocarbon resins. More particularly, it relates to the isomerization of an olefin modifier stream prior to its incorporation into the feedstock utilized for synthesis of a hydrocarbon resin and to the resin products resulting therefrom.

BACKGROUND OF THE INVENTION

It is taught in U.S. Pat. No. 3,577,398 that a mixture of piperylene and 2-methylbutene-2 polymerizes in the presence of a metal halide catalyst to form a series of hydrocarbon polymers which are very useful in a number of commercial applications requiring resinous materials.

One particular application is as components of industrial adhesives. For the pressure sensitive adhesives, for example, increasing the softening point of the resinous component improves the adhesive peel strength and elevated temperature response of the adhesive.

Conventional sources of piperylene mixtures used to produce these resinous hydrocarbon products are crude feed streams derived from steam cracked naphthas and catalytically cracked distillate streams containing large quantities of olefins in the $C_5$ to $C_{10}$ ranges (see U.S. Pat. Nos. 2,753,325 and 2,753,382). Streams generally have large amounts of other unsaturated hydrocarbons, particularly hydrocarbons containing from 4 to 6 carbon atoms. Representative examples of such hydrocarbons are 2-methylbutene-1, 3-methylbutene-1, pentene-1, pentene-2, and isoprene. According to U.S. Pat. No. 3,577,398 up to about 50 weight percent of said unsaturated hydrocarbons based on the weight of the piperylene 2-methylbutene-2 mixture can be present without deleteriously modifying the polymerized resin. The primary unsaturated hydrocarbons in these feed streams are pentene-1, 2-methylbutene-1, t-pentene-2, c-pentene-2, 3-methylbutene-1 and cyclopentene.

It is known that mono-olefin feedstocks can be usefully isomerized by double bond migration to convert 2-methylbutene-1 and/or 3-methylbutene-1 to 2-methylbutene-2 and pentene-1 to cis- and trans-pentene-2 (see U.S. Pat. Nos. 3,151,179; 3,268,617; 3,290,404; and 3,920,765).

It is desirable to obtain hydrocarbon resins with lower molecular weights but without detrimental loss of softening points in view of the better high temperature properties the higher softening point contributes in the end use formulations with other polymers.

It is therefore an object of this invention to provide a process for the polymerization of olefins obtained from a crude feed stream obtained from the cracking of petroleum fractions whereby hydrocarbon resins of lower molecular weight are obtained.

STATEMENT OF THE INVENTION

It has been discovered that the presence of branched olefins with internal double bonds lead to higher resin softening points, other factors being equal, in the aluminum chloride-catalyzed polymerization of $C_5$ olefins and diolefins.

It has been further discovered that the terminal olefins, branched at the unsaturation, e.g. 2-methylbutene-1, occurring in the steam cracked naphthas and in catalytically cracked olefin streams, can be isomerized to the more desirable internal double bonded olefin isomer, e.g. 2-methylbutene-2 isomer, by passing the crude feed stream over an acidic solid catalyst, preferably a sulfonic acid resin or so-called ion-exchange resin. The resin is preferably insoluble and of the macrorecticular type, giving ready access to the internal acid sites.

Thus, in accordance with the object of this invention, there has been obtained a process for the preparation of a polymeric resinous composition comprising from 40 to 50 weight percent units derived from piperylene, 15 to 20 weight percent units derived from 2-methylbutenes and the balance derived from other olefinic compounds having five to six carbons, said 2-methylbutenes being present as the 2-methylbutene-2 isomer and the 2-methylbutene-1 isomer and in a weight ratio of former to latter greater than 10, preferably 15 to 100, optionally from 18 to 30, whereby said composition has a melting point of from 90° C. to 100° C. comprising the steps of:

(a) isomerizing the 2-methylbutene-1 component of a branched olefin modifier stream to provide a branched olefin modifier stream enriched, preferably 2-methylbutene-2, by 300 to 600 weight percent, in the component;

(b) admixing said enriched modifier stream and a piperylene rich feed stream to form a feedstock for resinification;

(c) thereafter catalytically polymerizing said feedstock in the presence of aluminum halide catalyst; and, (d) recovering the resulting hydrocarbon resins.

In a preferred sense, one admixes from 2 to 10 wt. percent of the branched olefin enriched modifier stream with the piperylene rich feed stream in order to provide the feedstock to be subjected catalytically induced polymerization to provide the hydrocarbon resin.

DETAILED DESCRIPTION OF THE INVENTION

As seen from the above, the invention has combined the procedures of isomerization and polymerization in sequence to synthesize a crude cracked feedstock into a hydrocarbon resin having highly useful properties for sealing applications, such as pressure-responsive sealing of adjacent surfaces between which said resin mixed with such rubbers as natural rubber, polyisoprene, block polymers of styrene and isoprene, etc. is positioned.

Isomerization of the branched olefin modifier stream (available from steam cracked naphtha or catalytically cracked olefins) is provoked by passing the modifier stream over an acidic solid catalyst. Preferably, the acidic solid catalyst is strongly acidic polymer such as nuclear sulfonated polystyrene or copolymer of styrene and divinyl benzene. Optimally, the catalysts most suited for this invention are the macroreticular type sulfonated resins which are made by including in the polymerization of, for instance, the styrene and divinyl benzene, an inert material which is eventually washed out leaving large voids in the resins, such as macroreticular pores. After these macroreticular ion-exchange, for instance, styrene divinyl benzene resins, are prepared, they are treated with sulfuric acid to obtain the particular sulfonated ion-exchange resins useful as catalysts in this invention. The sulfonic acid groups are attached to the benzene nuclei of the resins.

Examples of some sulfonated macroreticular styrene-divinyl benzene resins of the type described for use in this application are MSC-1-H by the Dow Chemical Company and XN-1005, XN-1010 and XE-284 and Amberlyst IR-15 (preferred for use herein) by Rohm and Haas Company. The resin catalyst is employed at moderate temperatures of 10° to 70° C., preferably at 20° to 50° C. At too high temperatures, ca 75° to 100° C., formation of dimers of isoprene and the methylbutne-1 and -2 olefins occurs with loss of desirable materials and color development in the product. Residence times vary with conversion desired and agitation provided. In an agitated system, a ratio of one part catalyst to five parts olefin is sufficient if maintained at 35° to 40° C. for one hour. In flow systems where the catalyst is in a fixed bed, longer residence times are necessary, say 1 volume olefin/volume catalyst/hour at 40° C. although generally from 0.5 to 5.0 volume of olefin/volume of catalyst/hour is useful depending on the temperature in use.

The crude cracked streams from steam cracked naphtha generally have from 4 to 10 weight parts of 2-methylbutene-1per weight part of 2-methylbutene-2 whereas the crude stream from catalytically cracked $C_5$ to $C_{10}$ olefins has from 1 to 2 weights of 2-methylbutene-1 per weight part of 2-methylbutene-2. The isomerization process as practiced according to this invention reduces the weight part of 2-methylbutene-1 to less than 1.0, preferably from 0.5 to 0.1, optimally less than 0.25, per weight part of 2-methylbutene-b 2.

A naptha produced by stream cracking contains large amounts of diolefins, olefins, aromatics, and some paraffins. The $C_5$ fraction (18° to 60° C.) from such a naphtha contains 15 to 20 weight percent isoprene, 10 to 15 weight percent cyclopentadiene, 10–15 weight percent piperylene, 5 weight percent other diolefins, 15–20 weight percent tertiary olefins, 20–25 weight percent normal olefins, and 2 to 5 weight percent paraffins.

By using an initial, mild thermal soaking of the $C_5^+$ fraction containing olefins, diolefins, cyclic diolefins, and aromatics at a temperature of 38° to 120° C. and sufficient treating time, the cyclopentadienes are dimerized and are removed as the dimers from the bottom of a distillation tower. This tower is operated to prevent any substantial depolymerization of the cyclodienes. The overhead, consisting of the undimerized portion, contains chiefly olefins and diolefins and aromatics, including the isoprene. Isoprene is recovered from the 16° to 38° C. fraction by extractive distillation. The remaining $C_5$ fraction from isoprene extraction feed preparation contains major amounts of pentene-1, cis and trans pentene-2 and 2-methylbutene-1, and smaller amounts of isoprene, piperylene and 2-methylbutene-2. It is this stream that is usually treated by the process of this invention.

Alternatively, the naphtha fraction from catalytic cracking which contains 2-methylbutene-1 and 2-methylbutene-2 in roughly equal amounts, can be treated in a similar fashion with the aforementioned sulfonic acid resins.

This isomerized enriched modifier stream is thereafter subjected to the polymerization step. The enriched modifier stream can be treated prior to the polymerization step to enhance its purity and/or admixed with an other diluent, e.g. benzene, heptane, or mixtures thereof in amounts necessary to achieve the desired results.

The enriched modifier stream, isomerized in accordance with this invention, is readily polymerized after its combination into, generally in amounts of 2 to 10%, a piperylene rich stream by the presence of an aluminum halide, e.g. aluminum chloride catalyst, more generally an anhydrous metallic halide catalyst.

Representative examples of such catalysts are fluorides, chlorides, bromides, and iodides of metals such as aluminum, tin, and boron. Such catalysts include, for example, aluminum chloride, stannic chloride and boron trifluoride.

In carrying out the polymerization reaction, the hydrocarbon mixture is brought into contact with the anhydrous metal halide catalyst. Generally, the catalyst is used in particulate from. Generally, a particle size in the range of from about 5 to about 200 mesh size is used although larger or smaller particles can be used. The amount of catalyst used is not critical although sufficient catalyst must be used to cause a polymerization reaction to occur. The catalyst may be added to the olefinic hydrocarbon mixture or the hydrocarbon mixture may be added to the catalyst. If desired, the catalyst and mixture of hydrocarbons can be added simultaneously or intermittently to a reactor. The reaction can be conducted continuously or by batch process techniques generally known to those skilled in the art.

The reaction is conveniently carried out in the presence of a diluent because it is usually exothermic and the product is viscous. However, with adequate mixing and cooling, the temperature can be controlled and reaction conducted with only sufficient diluent to maintain good transfer out of the heat of polymerization. The diluent may be introduced as a component of the feedstock for resinification, e.g. in the example benzene is introduced as a major (about 50%) component of the piperylene rich feed stream. Various diluents which are inert in that they do not enter into the polymerization reaction may be used. Representative examples of inert diluents are aliphatic hydrocarbons such as pentane, hexane, and heptane, aromatic hydrocarbons such as toluene and benzene, and unreacted residual hydrocarbons from the reaction.

A wide range of temperatures can be used for the polymerization reaction. The polymerization can be carried out at temperatures in the range of from about −20° C. to about 100° C., although usually the reaction is carried out at a temperature in the range of from about 0° C. to about 50° C. The polymerization reaction pressure is not critical and may be atmospheric or above or below atmospheric pressure. Generally, a satisfactory polymerization can be conducted when the reaction is carried out at about autogeneous pressure developed by the reactor under the operating conditions used. The time of the reaction is not generally critical and reaction times can vary from a few minutes to 12 hours or more.

The yield and softening point of the final resin ranges from 20 to 45 percent and 90° C. to 100° C., respectively.

The improved product of this invention made by polymerization of the enriched modifier stream in conjunction with the piperylene containing stream results in a hydrocarbon resin with from 40–50 weight percent units derived from piperylene and 15–20 weight percent units derived from 2-methylbutenes. The product of this invention, when made exclusively from steam cracked naphtha and after removal of the bulk of the isoprene, contains primarily 2-methylbutene-2 as the methylbutene modifier. The 2-methylbutene-2 to 2-methylbutene-1 ratio in the enriched modifier is at least 10. The product of the invention has softening points of 90°–100° C. and molecular weights lower than the unmodified resin. Molecular weights, as $\overline{M}w$, of about 1200 as measured by Gel Permeation Chromatography (GPC) were obtained for the products resins according to the inventive process when using the enriched modifier stream, as isomerized, in the preparation of the resin. Also for resins prepared from the process using the unmodified modifier stream, resins with similar molecular weight but lower softening points were obtained as will be seen in the example.

In contrast, resins obtained from polymerization of the piperylene rich feedstream only (no addition of the modifier stream) have $\overline{M}w$ of about 1600 - undesirably high.

EXAMPLES OF THE INVENTION

The best mode of the invention described herein is exemplified by the following sequential processes of isomerization, admixing, polymerizing and resin recovery:

(a) A branched olefin modifier stream (obtained from a solvent extracted $C_5$-$C_6$ isoprene rich stream of steam cracked naphtha) typically composed of 3 wt. % isoprene, 57 wt. % $C_5$-$C_6$ olefins, 35 wt. % 2-methylbutene-1 and 5 wt. % 2-methylbutene-2 was admixed with an isomerization catalyst, Amberlyst IR-15 available from Rohm and Haas, Philadelphia, Pa., at a rate of 1 volume of said stream per volume of catalyst per hour at 40° C. to provide the branched olefin enriched modifier stream. The resultant enriched modifier stream had a typical composition of 3 wt. % isoprene, 57 wt. % $C_5$-$C_6$ olefins, 5 wt. % of 2-methylbutene-1 and 35 wt. % of 2-methylbutene-2;

(b) 4 volume percent of said branched olefin enriched modifier stream was admixed into a piperylene rich feedstream (15 wt. % piperylene with minor amount of isoprene, 25 wt. % of $C_5$-$C_6$ olefins, 4 wt. % of 2-methylbutene-2 and balance diluent benzene) to provide the feedstock for resinification;

(c) The resulting feedstock was mixed with 1 wt. % of aluminum chloride catalyst at a temperature of 50° C. and residence time in excess of 30 minutes; and, (d) whereby a hydrocarbon resin was produced and recovered having a softening point of 96° C., a cloud point of below 90° C. and a color of 6 Gardner units. The cloud point determination is by visual observation of the onset of clouding of a solution of 2 wt. part resin, 1 wt. part of paraffin wax having a m. p. of 60° C. and 2 wt. parts of ethylene vinyl acetate polymer (28% vinyl acetate) heated to 150° C. and allowed to cool in air with stirring.

In contrast, when the aforesaid branched olefin modifier stream is not enriched (no isomerization step) and admixed at a 4 volume percent into said piperylene rich feed stream for resinification according to the above process, a hydrocarbon resin was produced having a softening point of 89° C., a cloud point of below 90° C. and a color of 6 Gardner units.

The softening point is determined by ASTM procedure E28-67.

It is seen that the product of the invention has a softening point 7° C. higher than a product obtained under a process following prior art type teachings.

Not only are the products of the invention superior to known products, but the process by which they are made, better utilizes feeds available from cracking, particularly steam cracking, of heavy petroleum fractions.

The invention in its broader aspect is not limited to the specific details shown and described and departures may be made from such details without departing from the principles of the invention and without sacrificing its chief advantages.

What is claimed is:

1. A method for the preparation of hydrocarbon resins having a softening point of from 90° C. to 100° C. comprising the steps of:
    (a) isomerizing the 2-methylbutene-1 component of a branched olefin modifier stream to provide a branched olefin modifier stream enriched in the 2-methylbutene-2 component;
    (b) admixing said enriched modifier stream and a piperylene rich feed stream to form a feedstock for resinification;
    (c) thereafter catalytically polymerizing said feedstock in the presence of an aluminum halide catalyst; and
    (d) recovering the resulting hydrocarbon resins.

2. The method according to claim 1 wherein said isomerizing comprises exposing said branched olefin modifier stream to a macroreticular sulfonated polymeric ion exchange resin at a rate ranging from 0.5 to 5.0 volume of said feedstream per volume of said resin per hour and at a temperature ranging from 10° to 70° C.

3. A method according to claim 1 wherein said isomerizing enriches the 2-methylbutene-2 content of said modifier stream by from 300 to 600 weight percent.

4. A method according to claim 1 wherein said isomerizing is by contacting said modifier stream with a macroreticular acid ion exchange resin until the 2-methylbutene-2 content is increased by at least 250 weight percent whereby said modifier stream is converted into a branched olfein enriched modifier stream and said admixing introduces from 2 to 10 weight percent of said enriched modifier stream into said piperylene rich feedstream.

* * * * *